United States Patent
Ji et al.

(10) Patent No.: US 10,574,542 B2
(45) Date of Patent: Feb. 25, 2020

(54) SYSTEM AND METHOD FOR DISTRIBUTING RESOURCES THROUGHOUT A NETWORK

(71) Applicant: INTERNATIONAL BUSINESS MACHINES CORPORATION, Armonk, NY (US)

(72) Inventors: Pei Xing Ji, Shanghia (CN); Yun Qi Li, Shanghai (CN); Yan Lu, Shanghai (CN); Xiang Zhou, Shanghai (CN); Jin Fan Zhu, Shanghai (CN); Jia Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/446,607

(22) Filed: Mar. 1, 2017

(65) Prior Publication Data

US 2018/0254995 A1    Sep. 6, 2018

(51) Int. Cl.
  *G06F 15/173* (2006.01)
  *H04L 12/24* (2006.01)
  *G06F 9/50* (2006.01)
  *H04L 29/08* (2006.01)

(52) U.S. Cl.
  CPC ............ *H04L 41/5019* (2013.01); *G06F 9/50* (2013.01); *H04L 41/20* (2013.01); *H04L 67/1002* (2013.01); *H04L 67/1097* (2013.01)

(58) Field of Classification Search
  None
  See application file for complete search history.

(56) References Cited

U.S. PATENT DOCUMENTS

| 8,819,679 B2 | 8/2014 | Agarwal et al. | |
| 2009/0025004 A1* | 1/2009 | Barnard | G06F 9/50 718/104 |
| 2012/0054527 A1* | 3/2012 | Pfeifer | G06F 1/266 713/340 |
| 2012/0331321 A1* | 12/2012 | Kaburlasos | G06F 1/3228 713/323 |

(Continued)

OTHER PUBLICATIONS

Pandey, Suraj et al.; A Particle Swarm Optimization-based Heuristic for Scheduling Workflow Applications in Cloud Computing Environments; 2010 24th IEEE International Conference on Advanced Information Networking and Applications (AINA); Apr. 20-23, 2010; 8 pages.

(Continued)

*Primary Examiner* — Padma Mundur
(74) *Attorney, Agent, or Firm* — Schmeiser, Olsen & Watts, LLP; William Hartwell (57) ABSTRACT

The present invention provides a method and system for distributing resources for operating applications within a network by determining a composite resource consumption of the network of resources distributed throughout the network, and determining minimum, maximum and average values of each of the resources required to operate the applications. When an application is introduced into, or removed from, the network, then a change in the composite resource consumption of the network is determined and a software patch is generated to adjust resource distribution throughout the network so that resource allocation to active applications is normalized for optimal operation.

9 Claims, 6 Drawing Sheets

(56) References Cited

U.S. PATENT DOCUMENTS

| | | | |
|---|---|---|---|
| 2013/0090121 A1* | 4/2013 | Zhang | H04W 28/08 |
| | | | 455/450 |
| 2015/0100684 A1 | 4/2015 | Maes et al. | |
| 2015/0324220 A1* | 11/2015 | Bugenhagen | G06F 9/45533 |
| | | | 718/1 |
| 2015/0341240 A1 | 11/2015 | Iyoob et al. | |
| 2016/0154639 A1 | 6/2016 | Clark et al. | |
| 2016/0239294 A1 | 8/2016 | Li et al. | |
| 2016/0335122 A1* | 11/2016 | Ding | G06F 9/505 |

OTHER PUBLICATIONS

Rana, Mayank Singh et al.; Comparison of Probabilistic Optimization Algorithms for Resource Scheduling in Cloud Computing Environment; International Journal of Engineering and Technology (IJET); vol. 5 No. 2, Apr.-May 2013; pp. 1419-1427.

* cited by examiner

SYSTEM AND METHOD FOR DISTRIBUTING RESOURCES THROUGHOUT A NETWORK

TECHNICAL FIELD

The invention relates generally to the field of optimizing the distribution of resources for operating a computer network, and in particular to methods and systems for maintaining a resource adaptive cloud environment for distribution of resources with regards to a change of software applications in a network.

BACKGROUND

It can be difficult to deploy a new application to a network such as a cloud environment which is nearly full to capacity with regards to its computing resource capability. A common solution for dealing with a shortage of computing resources or an imbalance of resource distribution within a local network attached to a broader network or cloud is to detach as much of the local computing resources as possible from the cloud.

SUMMARY

The present invention provides a method and system for distributing resources for operating applications within a network by determining a composite resource consumption of the network of resources distributed throughout the network, and determining minimum, maximum and average values of each of the resources required to operate the applications. When an application is introduced into, or removed from, the network, then a change in the composite resource consumption of the network is determined and a software patch is generated to adjust resource distribution throughout the network so that resource allocation to active applications is normalized for optimal operation.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
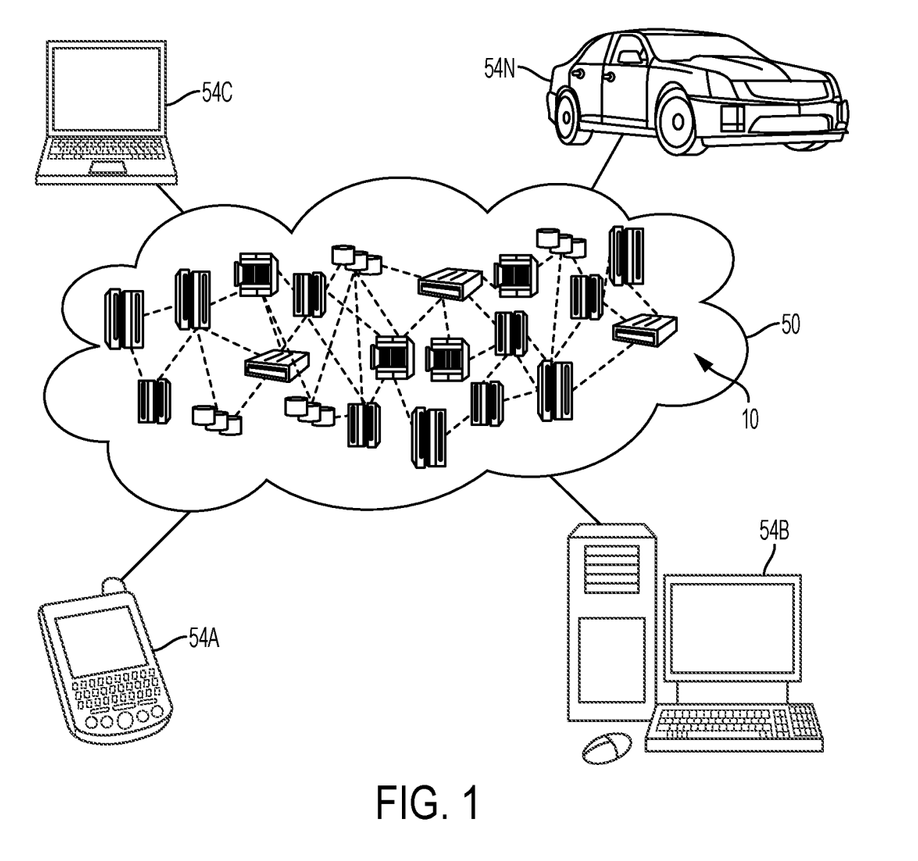
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein-above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
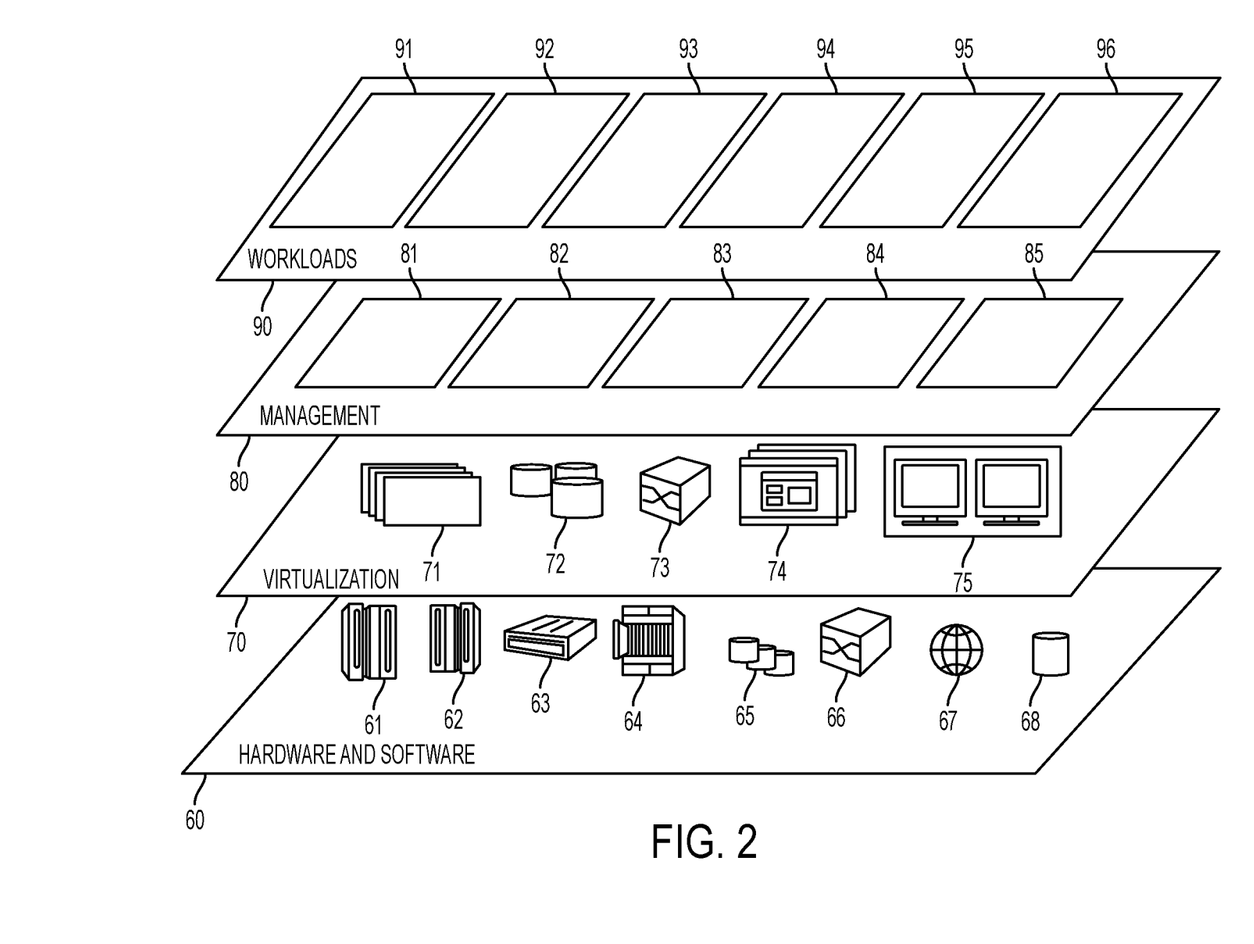
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adjusting computing resources of a network 96 upon change from addition or removal of an application.

It can be difficult to deploy a new application to a network such as a cloud environment which is nearly full to capacity with regards to its computing resource capability. Computing resources are distributed and required for operating both hardware components (e.g. processors, memory, etc.) and software components (e.g. applications) within a network. Computing resources can be defined for the overall computer system (e.g. global computing requirements of a network, enterprise or cloud environment) and the resources can include power dissipation, memory, and bandwidth of the system and the central processing units (CPUs) for operation of all the hardware and software components of the network. Both physical and virtual networks have minimum and maximum requirements and limits for the distribution of computing resources to ensure proper operation of all components and applications within a system.

A common solution for dealing with a shortage of computing resources or an imbalance of resource distribution within a local network attached to a broader network or cloud is to detach as much of the local computing resources as possible from the cloud. However, this solution is limited to a local platform and creates a more difficult situation for proper resource distribution upon additional occurrences of resource maximization. Additionally, this type of inadequate fix often requires adding hardware to the existing system. A resource adaptive system as described herein will evenly disperse computing resources based upon individual situations and requirements for existing resources.

Figure 3:
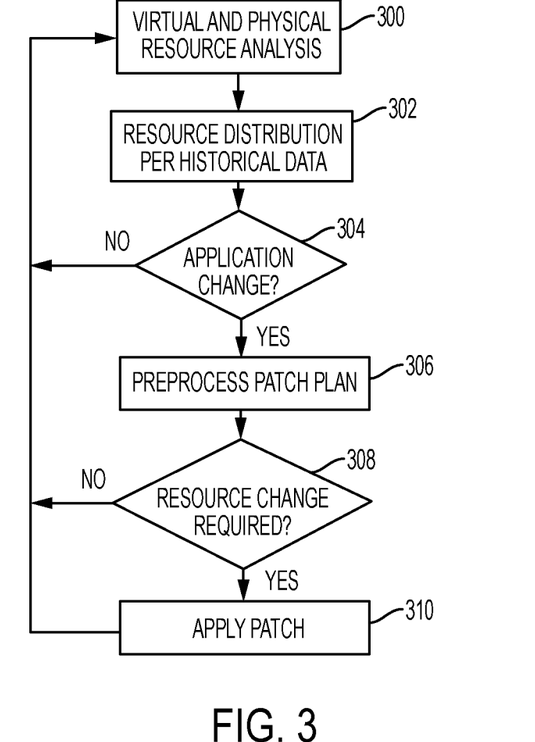
FIG. 3 is a flow chart diagram of a method in accordance with embodiments of the present invention.

FIG. 3 is a flow chart diagram of a method in accordance with embodiments of the present invention. In step 300 a virtual and physical resource analysis is taken of all computing resources of a system/network operating in a cloud computing environment. Cloud computing is a type of Internet based computing that provides shared computer processing resources and data to computers and other devices on demand. It is a model for enabling ubiquitous, on-demand access to a shared pool of configurable computing resources (e.g., computer networks, servers, storage, applications and services) which can be rapidly provisioned and released with minimal management effort. Cloud computing and storage solutions provide users and enterprises with various capabilities to store and process their data in either privately owned, or third-party data centers that may be located far from the user.

Once the resource analysis is completed, step 302 will generate an appropriate resource distribution map according to historical data which is stored and accessed from a database in one of the servers of the network. Computing resources include CPU power dissipation, memory and bandwidth available and distributed to servers, components and applications in the cloud. The historical data can be timestamped so that, for instance, each Monday morning at 6 am a certain distribution of computing resources of a network configuration of hardware and software applications may begin running. In another example, a backup routine may run between 1-3 am each night while other applications are dormant. Each different network configuration will require a different distribution or allocation of computing resources.

Step 304 tests for changes in active applications of the network. An application which has been launched and is running is considered to be active, whereas an application which has not been launched and is not running is considered to be inactive. If there is no change in active software applications, i.e. no change in the software applications being run in the system/network of the cloud environment, then the method returns to step 300 and continues to monitor and analyze the resource distribution and use. If a new application requiring the use of computing resources has been added to the network, or an application has been removed (i.e. is no longer operating) from the network, then the method continues to implement the appropriate adjustments.

A software patch for adjusting the computing resources according to the change detected in step 304 is created in step 306. The patch is generated by a processor of a computer of the network to adjust the computing resources within minimum requirements necessary to operate all applications and system components, and maximum allowed resources for distribution. A normal or default set of operating requirements for any given situation can be established.

If the detected change from adding or removing an application from the network/system is below a predetermined tolerance, then the patch is not applied since a change in distribution of computing resources is not necessary. Decision step 308 is answered in the negative, and the monitoring and analysis process continues in step 300. If the change in computing resource distribution is greater than the predetermined tolerance value, then the patch is applied to the system in step 310.

One way to represent a resource of a component of a network is to compare its value with its cost. In other words the value of a component such as a software application or a processor can be estimated by a parameter that compares value to the network with cost to the network (e.g. by measuring changes in power dissipation, memory and bandwidth use).

One representation of a minimal resource requirement for a software application added to a network is shown in Equation (1) below, where App_Resource(min) is defined as the minimal resource requirement of a given computing resource for a specific application, and where there is a minimum differential between the costs of implementing the application and the value of the application.

$$\text{App\_Resource(min)} = \min(\text{value} - \text{cost}) \qquad \text{Equation (1):}$$

The maximum resource requirement for operating the new application can be represented in Equation (2) as:

$$\text{App\_Resource(max)} = \max(\text{value} - \text{cost}) \qquad \text{Equation (2):}$$

App_Resource(max) represents the maximum resource requirement of a given computing resource for the specific application, where there is a maximum differential between the costs of implementing the application and the value of the application.

The value of an application can be quantified, for instance, by the improvement in quality of service QoS upon activation of the application. In turn the cost of activating the application can include CPU power dissipation, memory and bandwidth usage.

A software patch to adjust the resource distribution of the network when an application is launched can, for example, correspond to App_Resource(min), App_Resource(max) or to an intermediate (e.g. normal) resource distribution App_Resource(nor) which represents a typical resource distribution which falls within the boundaries of the minimal and maximum limits. The software patch can be implemented, for instance, to adjust the resource distribution so that every active application in the network receives as close as possible to a normal i.e. average set of operating resources which falls within the minimum resource distribution and the maximum resource distribution for that application. For example, if normal operations for a given software application require 2 GB RAM of memory in the processor, then the software patch will accommodate that requirement in creating a resource distribution map.

A strategy for global resources of the system/network can be represented for instance in Equation (3) as:

$$\text{Global\_Resources} = \sum_{x=1}^{m} \text{value} - \sum_{x=1}^{m} \text{cost} + \sum_{x=1}^{m} \text{patch} \qquad \text{Equation (3)}$$

where Global_Resources represents the composite resources available for the network and m is the number of active software applications. Minimal global resources necessary for operation of all active applications on the network can be determined by summing, for all active applications, the minimal QoS value parameters with the patch parameters and deducting the total costs. Maximum global resources necessary for operation of all active applications on the network can be determined by summing, for all active applications, the maximum QoS value parameters with the patch parameters and deducting the total costs. The value of the active applications in the network can be represented for instance in Equation (4), $$\text{value}(N) = B + \alpha \sum_{x=1}^{m} \Delta QoS = \qquad \text{Equation (4)}$$

-continued $$B + \left( v \sum_{x=1}^{m} \Delta \sqrt{ResponseTime} + \rho \sum_{x=1}^{m} \Delta \sqrt{TaskCompute} \right)$$

where the value(N) parameter of the active applications of the network equals a given constant B for basic network functioning, plus the sum of QoS quality of service values of the m active applications. Value(N) is further defined in terms of the sum of the square root of the response times of the m applications added to the sum of the task computing environment of the m applications whereby the task computing environment (i.e. TaskCompute) is directly related to the latency (i.e. computing latency) of the system/network/cloud.

Computing latency is a delay or period of time that one component in a system is spinning its wheels waiting for another component. In cloud computing, computing latency is a problem defined as the delay for packets moving over the various networks between the end user's computer, the cloud provider's application platform, and any storage networks. As an example if we allocate 10 CPU cores and 100 GB memory for an application, and if the 10 CPU cores come from 5 physical machines, then the computing latency is large and the task computing environment is bad. However, if the 10 CPU cores come from a single physical machine, then the computing latency is small and the task computing environment for the application is good.

The cost of the active applications in the network is represented for instance in Equation (5).

$$\text{cost}(N) = A + \left( \alpha \sum_{1}^{x} \text{core} + \beta \sum_{1}^{x} \text{memory} + \eta \sum_{1}^{z} \text{storage} \right) * \sum \text{network\_traffic}$$

Equation (5)

Here the network cost(N) is represented as a sum of core, memory and bandwidth parameters for the m active applications times the sum of the network traffic which in turn can be represented or measured in terms of bandwidth used for the active applications.

Figure 4:
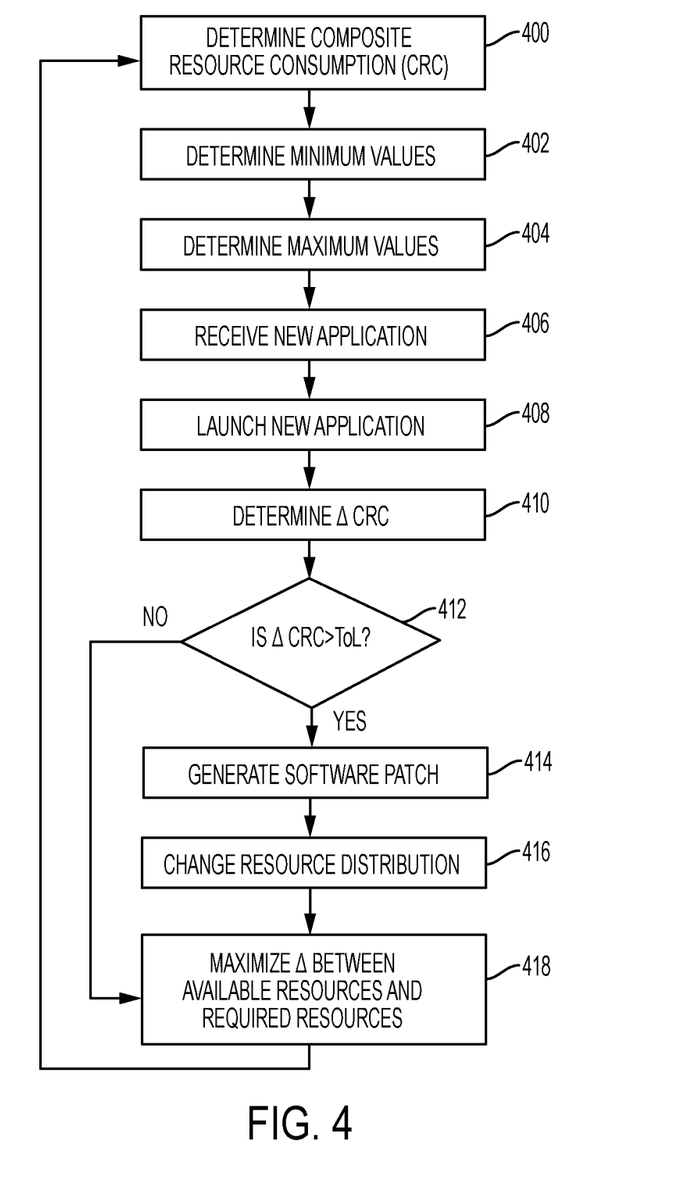
FIG. 4 is a flow chart diagram of a method in accordance with embodiments of the present invention.

FIG. 4 is a flow chart diagram of a method in accordance with embodiments of the present invention. The methods are implemented by one or more network components, such as but not limited to a server, processor, input device, output device and memory device.

In step 400 a composite resource consumption (CRC) value is determined for the network. Various measurable values can be used such as response time of components and software, and task computation efficiency and accuracy. Minimum computing resource values to operate the network and all of the active applications is determined in step 402. Maximum computing resource values available and/or allowable to operate the network and all of the active applications is determined in step 404. These minimum and maximum values can be obtained from a database stored within the network.

In step 406 a new application is introduced into the network and it is launched, i.e. activated, in step 408. A change in the system CRC value is determined in step 410 which is attributed to the requirements for operating the new application. If the change in the system CRC exceeds a predetermined tolerance of composite resource consumption, then decision step 412 is answered in the affirmative. A software patch is generated in step 414 which is designed to evenly disperse the computing resources where needed to effectuate the smoothest operation of the network with least strain on any given elements. In other words, it is most desirable to operate each of the active applications in a normal operational range of resource consumption rather than to operate some applications near a maximum tolerance limit, while others are being operated at or near a minimum requirement.

In step 416 the resource distribution map is changed and redistribution of the computing resources is accomplished to accommodate the new application into the network. A maximized or optimal redistribution is effectuated in step 418 between the available resources and the required resources needed for operation of the applications of the network. The process continues back to step 400 to monitor and adjust the network resource distribution as necessary for optimal operation.

Figure 5:
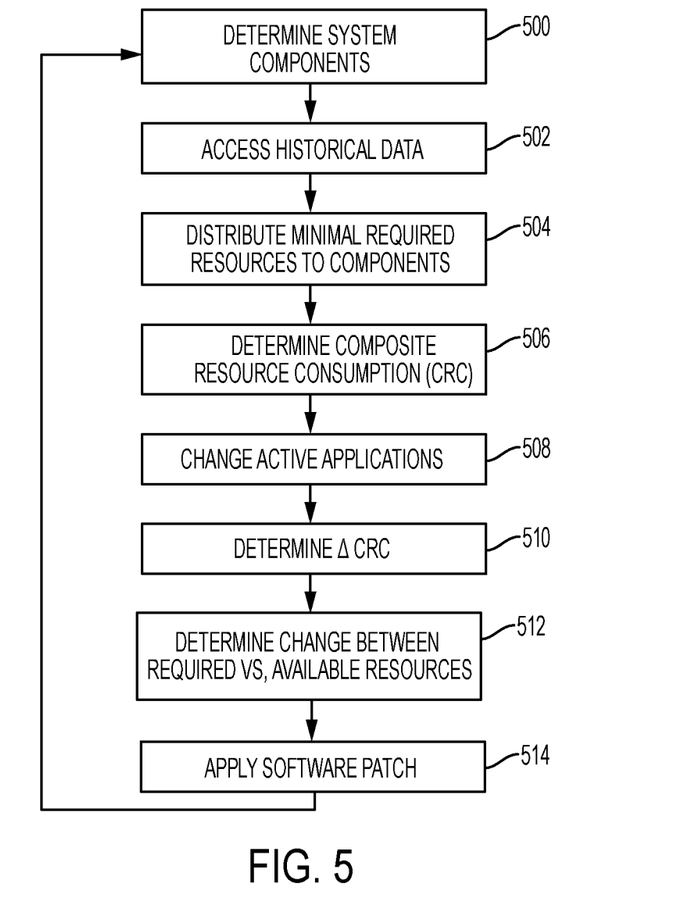
FIG. 5 is a flow chart diagram of a method in accordance with embodiments of the present invention.

FIG. 5 is a flow chart diagram of a method in accordance with embodiments of the present invention. In step 500 system components and active applications are determined by one of the servers of the system/network. Historical data is accessed in step 502 by a server from a database to match the current network configuration of components and active applications. In step 504 minimal required computing resources are distributed to each of the system components and active applications to ensure proper operation. Composite resource consumption CRC is determined in step 506 for the total computing resource values of the system.

In step 508 the active applications of the system are changed. For instance, a formerly active application can be de-activated or removed from the system, or a new application (or an application existing in the system but previously dormant) can be activated into operation. This typically results in a change in the overall computing resource requirements and distribution which is determined as a change in the CRC by an analysis program located on a server in step 510. A determination is also made of a change between required (e.g. minimum) versus available resources in step 512. A software patch is generated and applied to the system in step 514 in order to maintain an optimal distribution of computing resources throughout the system/network/cloud environment. Following implementation of the software patch, monitoring and redistribution of resources continues in step 500.

Figure 6:
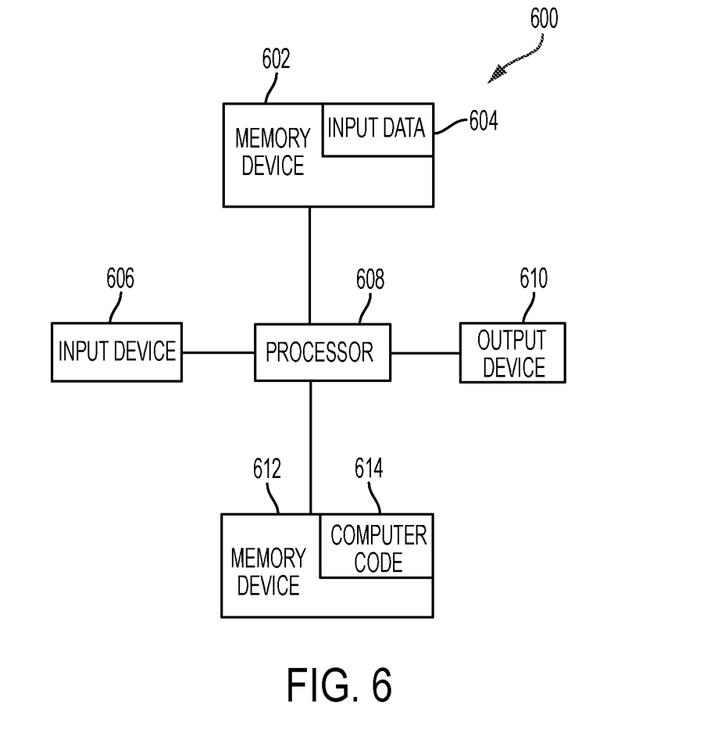
FIG. 6 illustrates a computer system for implementing the methods of the present invention.

FIG. 6 illustrates an embodiment of a computer system used for implementing the methods of the present invention. The computer system 600 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions. The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614. Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

In yet another embodiment the inventive method can be implemented in a system/network with limited hardware such as 100 physical servers and 2000 personal computers in different locations whereby service is provided via a cloud environment with physical computing resources.

Historical runtime data stored in a memory of the system for each active application can include:

(1) Normal required resources, such as 5 CPU core power dissipation, 5 gigabytes of memory and a normal bandwidth range of frequencies for proper operation which are obtained from an evaluation of the specific application, and can be adjusted based upon the given time and circumstances of operation.

(2) Minimum computing resources being the lowest required resource consumption for operation of the application, such as 1 CPU core power dissipation, 1 gigabyte of memory and a minimal bandwidth range of frequencies for proper operation which can be adjusted for the given time and circumstances of operation.

(3) Maximum computing resources available such as 10 CPU core power dissipation, 10 gigabytes of memory, 100 gigabytes additional storage and a broad bandwidth range of frequencies for operation, which can be adjusted based upon the historical runtime data for the given time and circumstances of operation.

A change in resource consumption and distribution becomes necessary for an added or deleted application into the network and this change can be pre-processed in an application patch. The patch can be preprocessed by increasing or decreasing the available resources to optimally provide the normal status of resource consumption and allocation for the application and the system according to the system resource analysis. A patch can be created with virtual resources and mapped to physical resources according to the cost rate ranking and the value rate ranking of the application in comparison with other applications of the network. The patch can be applied when a new application is added or deleted from the network, or when corresponding physical resources of the network involved in the operation of the application have changed.

A resource graph based on all the available physical resources in different locations together with the software application and the global strategy formula of equation (3) can be used to apply an enhanced ant colony optimization for the best solution to be followed by the software patch. The problem of overextending resources where they are not needed is overcome since the patch can be specifically directed for optimal performance to computing resources for the given application as well as the corresponding virtual and physical components as necessary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for distributing resources to operate applications within a network, said method comprising:
    determining, by one or more processors, a composite resource consumption of resources distributed to a totality of components of the network;
    determining, by the one or more processors, minimum values of each of the resources required to operate the applications, and maximum values of each of the resources available to operate the applications, wherein the minimum of each of the resources required to operate each application is a minimum value of (V minus C), wherein the maximum of each of the resources required to operate each application is a maximum value of (V minus C), wherein V is the value of each application to the network, wherein C is the cost of each application to the network, wherein the value V of each application to the network comprises an improvement in quality of service (QoS) upon activation of each application, and wherein the cost C of each application to the network comprises costs due to changes in power dissipation, memory and bandwidth use;
    changing, by the one or more processors, the totality of components of the network by either adding, by the one or more processors, a new application to the network or removing, by the one or more processors, an existing application from the network;
    in response to said changing the totality of components of the network, determining, by the one or more processors, a change in the composite resource consumption of the network;
    generating, by the one or more processors in response to the determined change of the composite resource consumption, a software patch comprising program instructions for redistributing the resources to active applications and components of the network; and
    executing, by the one or more processors, the software patch which redistributes the resources for each application to operate at average values of the resources required to operate the applications, said average values being within a range established between the minimum and maximum values of the resources required to operate the applications.

2. The method of claim 1, said method further comprising determining, by the one or more processors, based upon historical runtime data stored in a database: the composite resource consumption of the resources of the totality of components of the network, the minimum values of the resources required to operate the applications, the maximum values of the resources available to operate the applications, and the average values of the resources required to operate the applications.

3. The method of claim 1, wherein the software patch is provided as a service in a cloud environment.

4. A computer program product, comprising one or more computer readable hardware storage devices having computer readable program code stored therein, said program code containing instructions executable by one or more processors of a computer system to implement a method for distributing resources for operating applications within a network, said method comprising:

determining, by the one or more processors, a composite resource consumption of resources distributed to a totality of components of the network;

determining, by the one or more processors, minimum values of each of the resources required to operate the applications, and maximum values of each of the resources available to operate the applications, wherein the minimum of each of the resources required to operate each application is a minimum value of (V minus C), wherein the maximum of each of the resources required to operate each application is a maximum value of (V minus C), wherein V is the value of each application to the network, wherein C is the cost of each application to the network, wherein the value V of each application to the network comprises an improvement in quality of service (QoS) upon activation of each application, and wherein the cost C of each application to the network comprises costs due to changes in power dissipation, memory and bandwidth use;

changing, by the one or more processors, the totality of components of the network by either adding, by the one or more processors, a new application to the network or removing, by the one or more processors, an existing application from the network;

in response to said changing the totality of components of the network, determining, by the one or more processors, a change in the composite resource consumption of the network;

generating, by the one or more processors in response to the determined change of the composite resource consumption, a software patch comprising program instructions for redistributing the resources to active applications and components of the network; and executing, by the one or more processors, the software patch which redistributes the resources for each application to operate at average values of the resources required to operate the applications, said average values being within a range established between the minimum and maximum values of the resources required to operate the applications.

5. The computer program product of claim 4, said method further comprising:

determining, by the one or more processors, based upon historical runtime data stored in a database: the composite resource consumption of the resources of the totality of components of the network, the minimum values of the resources required to operate the applications, the maximum values of the resources available to operate the applications, and the average values of the resources required to operate the applications.

6. The computer program product of claim 4, wherein the software patch is provided as a service in a cloud environment.

7. A computer system, comprising one or more processors, one or more memories, and one or more computer readable hardware storage devices, said one or more hardware storage device containing program code executable by the one or more processors via the one or more memories to implement a method for distributing resources for operating applications within a network, said method comprising:

determining, by the one or more processors, a composite resource consumption of resources distributed to a totality of components of the network;

determining, by the one or more processors, minimum values of each of the resources required to operate the applications, and maximum values of each of the resources available to operate the applications, wherein the minimum of each of the resources required to operate each application is a minimum value of (V minus C), wherein the maximum of each of the resources required to operate each application is a maximum value of (V minus C), wherein V is the value of each application to the network, wherein C is the cost of each application to the network, wherein the value V of each application to the network comprises an improvement in quality of service (QoS) upon activation of each application, and wherein the cost C of each application to the network comprises costs due to changes in power dissipation, memory and bandwidth use;

changing, by the one or more processors, the totality of components of the network by either adding, by the one or more processors, a new application to the network or removing, by the one or more processors, an existing application from the network;

in response to said changing the totality of components of the network, determining, by the one or more processors, a change in the composite resource consumption of the network;

generating, by the one or more processors in response to the determined change of the composite resource consumption, a software patch comprising program instructions for redistributing the resources to active applications and components of the network; and executing, by the one or more processors, the software patch which redistributes the resources for each application to operate at average values of the resources required to operate the applications, said average values being within a range established between the minimum and maximum values of the resources required to operate the applications.

8. The computer system of claim 7, said method further comprising:

determining, by the one or more processors, based upon historical runtime data stored in a database: the composite resource consumption of the resources of the totality of components of the network, the minimum values of the resources required to operate the applications, the maximum values of the resources available to operate the applications, and the average values of the resources required to operate the applications.

9. The computer system of claim 7, wherein the software patch is provided as a service in a cloud environment.

* * * * *